UNITED STATES PATENT OFFICE.

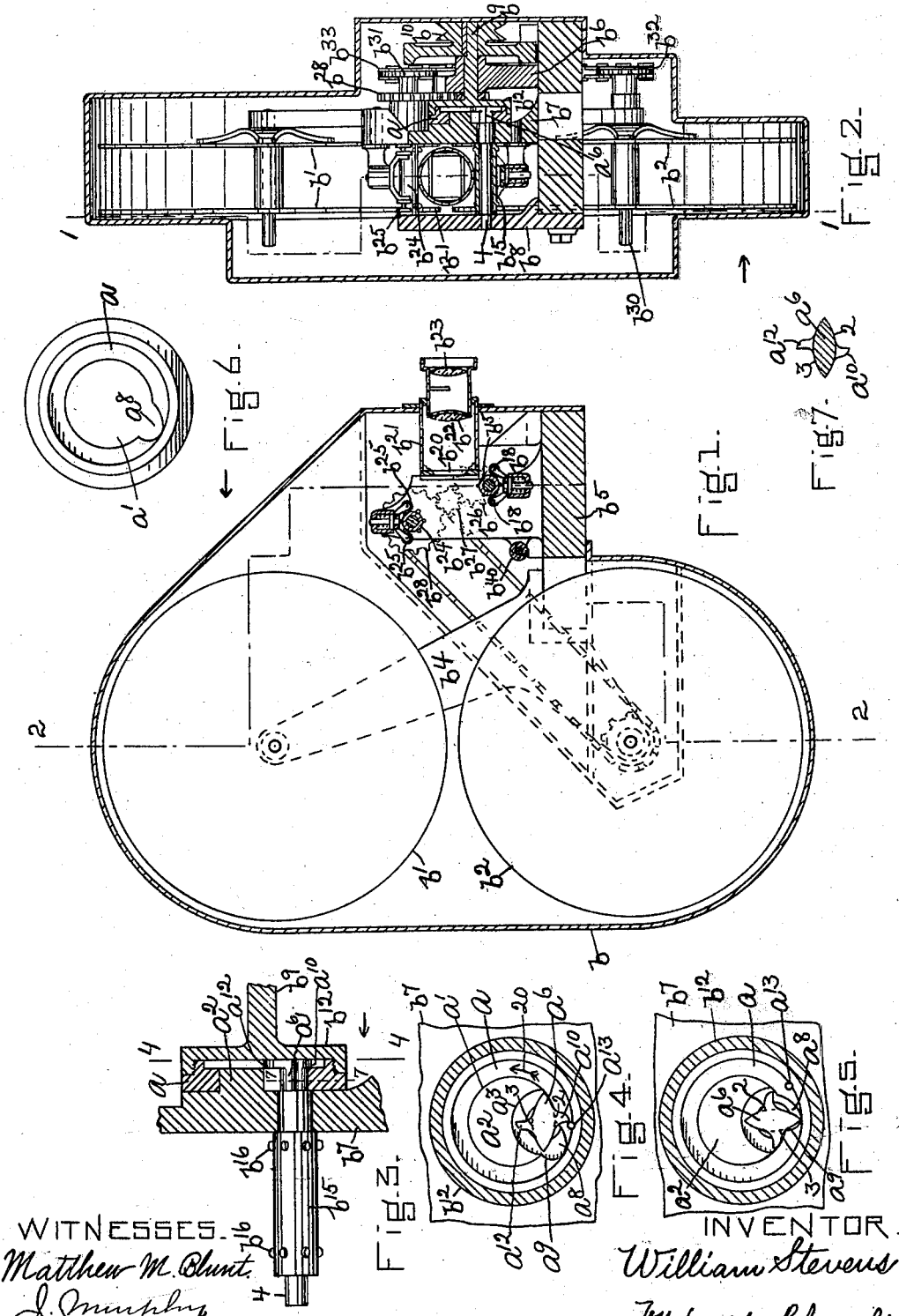

WILLIAM STEVENS, OF BRAINTREE, MASSACHUSETTS, ASSIGNOR OF ONE-HALF TO WINFIELD S. BELL, OF PITTSBURG, PENNSYLVANIA.

STOP MECHANISM.

SPECIFICATION forming part of Letters Patent No. 627,241, dated June 20, 1899.

Application filed December 28, 1897. Serial No. 663,819. (No model.)

*To all whom it may concern:*

Be it known that I, WILLIAM STEVENS, a citizen of the United States, residing in Braintree, in the county of Norfolk and State of Massachusetts, have invented an Improvement in Stop Mechanism, of which the following description, in connection with the accompanying drawings, is a specification, like letters and figures on the drawings representing like parts.

This invention relates to an intermittent mechanical movement or stop mechanism and is herein shown as embodied in a camera or projector, in which apparatus it is especially applicable for producing an intermittent feed of the picture-film, so that a prolonged stay or exposure of the picture and a quick withdrawal of the same may be obtained to thereby stop vibration on the screen upon which the picture is projected and which is painful to the eyes and also to avoid the rain effect now commonly produced on the said screens. This result is obtained by a novel construction of feed-movement for the picture-film, as will be described.

Figure 1 is a vertical section of one form of camera or projector embodying this invention, the section being taken on the line 1 1, Fig. 2, looking toward the right; Fig. 2, a transverse section of the projector shown in Fig. 1 on the irregular line 2 2; Fig. 3, a detail of the feed-movement to be referred to; Fig. 4, a section on the line 4 4, Fig. 3, looking toward the left, showing the parts in the position they occupy when the feed is about to take place; Fig. 5, a view similar to Fig. 4, showing the parts in the position they occupy during the progress of the feed; Figs. 6 and 7, details to be referred to.

The movement which forms the essential feature of this invention and which is herein shown as embodied in a camera or projector as the feed for the picture-film comprises, essentially, two rotatable or movable members, which I prefer to designate as the "driving" and "driven" members.

The driving member is preferably made as herein shown and consists of a plate, ring, or disk $a$, provided with a central circular opening $a'$, which fits over and revolves upon a segmental journal, boss, or projection $a^2$, having a reëntrant portion $a^3$, which imparts to the said journal approximately the form of a crescent, as shown in Figs. 4 and 5. The driven member consists of a substantially canoe-shaped body or piece $a^6$, preferably of metal and having its opposite faces 2 3 made in arcs of the same circle—namely, that of the circular opening $a'$ in the member $a$—the member $a^6$ having its center within the opening $a'$ and adjacent to the circumference of the circular opening $a'$, and in order to permit the canoe-shaped member $a^6$ to turn on its center the member $a$ is provided with a recess or opening $a^8$, having one of its walls $a^9$ made in the arc of a circle which is substantially the same as the circular sides 2 3 of the driven member $a^6$, for a purpose as will be described.

The driven member $a^6$ is provided with lugs or projecting arms $a^{10}$ $a^{12}$, extended from its upper face substantially at right angles to the length of said member, and the said arms are adapted to be engaged by a pin, stud, or projection $a^{13}$ on the driving member $a$ once for every revolution of said driving member. The rotary movement of the driven member $a^6$ is permitted by the opening $a^8$ in the driving member, which opening may and preferably will be of a width equal to about one-ninth of the circumference of the circular opening $a'$ in the driving member, so that for eight-ninths of the circumference of said opening the driven member $a^6$ is locked against rotation. The driven member $a^6$ is turned one-half a revolution for each complete revolution of the driving member by the engagement of the pin or projection $a^{13}$ with one of the arms $a^{10}$ $a^{12}$ and by the end wall $a^9$ of the opening $a^8$.

Referring to Fig. 4, the pin or projection $a^{13}$ is shown as about to engage the arm $a^{10}$ of the driven member, the driving member $a$ moving in the direction indicated by the arrow 20. As the driving member $a$ is moved in the direction indicated by the arrow 20 its pin or projection $a^{13}$ engages the arm $a^{10}$ and turns the member $a^6$ about its center and removes one circular side, as 2, from engagement with the circumferential wall of the circular opening $a'$, bringing one pointed end of the member $a^6$ into the opening $a^8$, as represented in Fig. 5, and at or about the time the pin or projection $a^{13}$ passes by or out of engagement with the arm $a^{10}$ the curved end wall $a^9$ of the opening $a^8$ engages the opposite circular side 3 of the driven member and continues the rotary movement of the driven member until it has turned the latter one-half a revolution, at which time the circular side 3 of the driven member is brought into engagement with the circumferential wall of the opening $a'$ and the driven member is thereby locked against rotary movement until the driving member has completed one revolution, and on the second revolution of the driving member the driven member is given another half-rotation by the pin $a^{10}$ and wall $a^9$ of the opening $a^8$ engaging the other arm $a^{12}$ of the driven member.

The mechanical movement herein described is especially advantageous for use with cameras or projectors as a feed-movement for the film, and in Figs. 1 and 2 I have shown the same adapted to a camera or projector consisting of a box or casing $b$, which contains two reels $b'\ b^2$, mounted in suitable bearings in a framework $b^4$, attached to a base $b^5$, which latter supports uprights $b^6\ b^7\ b^8$. (See Fig. 2.) The upright $b^6$ supports in suitable bearings a rotary shaft $b^9$, provided, as shown, with a driving-pulley $b^{10}$ and with a disk $b^{12}$, to which the driving member $a$ is suitably attached to revolve therewith about the segmental journal $a^2$, secured to or forming part of the upright $b^7$. The upright $b^7$ forms a bearing for one end of the shaft or pivot 4 for the driven member $a^6$, the other end of said shaft being journaled in the upright $b^8$. The shaft 4 has secured to it, so as to form practically a part thereof, a sleeve or hub $b^{15}$, having at its opposite ends nubs or projections $b^{16}$, which form practically the teeth of a sprocket-wheel and which are designed in practice to engage suitable holes or perforations at the opposite sides of the picture-film. (Not herein shown, but which may be supposed to be drawn off from the reel $b'$ and wound upon the reel $b^2$.) The feed-roll or sprocket $b^{15}$ has coöperating with it, as herein shown, suitable spring-pressed rolls $b^{18}$, which hold the picture-film in engagement with the feed-roll.

The picture-film is fed past an opening $b^{20}$ in a lens-box $b^{21}$, containing suitable lenses $b^{22}\ b^{23}$, and is supported above the said lens-box by a sprocket-roll $b^{24}$, with which coöperate spring-actuated rolls $b^{25}$. The sprocket-roll $b^{24}$ is rotated in the same direction as the feed-roll or sprocket $b^{15}$ by a gear $b^{26}$ on the driving-shaft meshing with an intermediate pinion $b^{27}$, which meshes with a gear $b^{28}$ on the shaft of the sprocket-roll $b^{24}$, the said gears being of the proper relative size to regulate the speed of the sprocket-roll $b^{24}$ to the feed-roll $b^{15}$. The shaft of the sprocket-roll $b^{24}$ is connected to the shaft $b^{30}$ of the roll $b^2$ by sprocket-wheels $b^{31}\ b^{32}$ and a link chain $b^{33}$. The picture-film on its passage to the reel $b^2$ may pass over a supporting-roller $b^{40}$.

In practice the driving-shaft $b^9$ is designed to be revolved at a high rate of speed, and consequently it will be seen that the period of movement for the film, which is preferably about one-ninth the time it takes the shaft $b^9$ to make one revolution, is substantially negligible, and as a result the pictures projected on the screen are practically stationary and the rain effect or vibration on the screen is obviated and the painful and injurious effect on the eyes of the spectator is avoided, as the movement of the picture-film across is imperceptible.

I claim—

1. A stop mechanism, comprising a rotatable driving member having a circular opening to fit and turn upon a segmental journal or boss, and provided with an opening $a^8$, and with a projection adjacent to the opening $a^8$, and a rotatable driven member consisting of a canoe-shaped body having circular sides 2, 3, of substantially the same arc as the circumferential wall of the circular opening in the driving member, and provided with projecting arms which are engaged by the projection on the driving member to turn the canoe-shaped body into the opening $a^8$, substantially as and for the purpose specified.

2. A stop mechanism, comprising a rotatable driving member having a circular opening provided with a smooth circumferential wall, and a rotatable driven member located within the said circular opening and having arc-shaped faces of the same radius as the circular opening to engage said circumferential wall and actuated by the driving member to make one-half a revolution while the driving member is making a part of one revolution, and to remain locked for the remaining portion of the revolution of the driving member, substantially as described.

In testimony whereof I have signed my name to this specification in the presence of two subscribing witnesses.

WILLIAM STEVENS.

Witnesses:
 JAS. H. CHURCHILL,
 J. MURPHY.